J. Werner, Jr.,
Steam-Boiler Cleaner.
Nº 49,327. Patented Aug. 8, 1865.
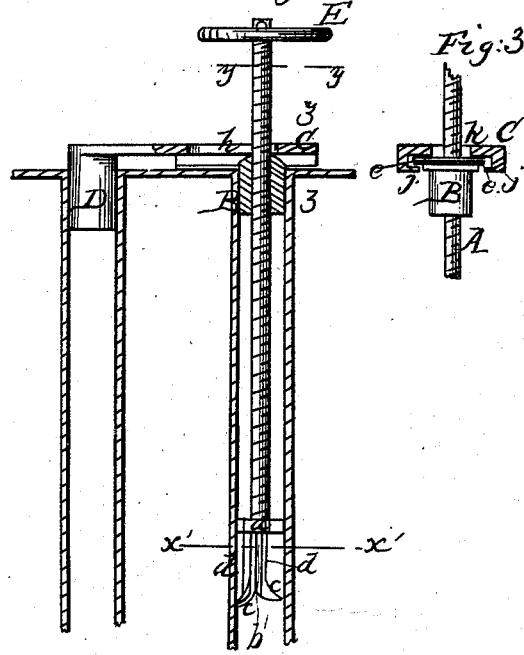
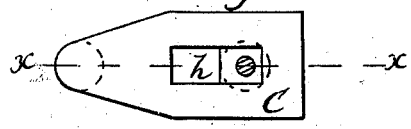
Witnesses:
Inventor:
John Werner Jr
per Munn & Co.
Attorneys

UNITED STATES PATENT OFFICE.

JOHN WERNER, JR., OF PRAIRIE DU SAC, WISCONSIN

IMPROVEMENT IN TOOLS FOR SCALING BOILER-TUBES.

Specification forming part of Letters Patent No. 49,327, dated August 8, 1865; antedated July 26, 1865.

*To all whom it may concern:*

Be it known that I, JOHN WERNER, Jr., of Prairie du Sac, in the county of Sauk and State of Wisconsin, have invented a new and useful Implement for Cleaning the Tubes of Tubular Boilers; and I do hereby declare that the following is a full, clear, and exact description thereof, which will enable those skilled in the art to make and use the same, reference being had to the accompanying drawings, forming part of this specification, in which—

Figure 1 is an elevation of my invention applied to its work, the guide-plate of the nut and screw, as well as the nut itself, being in section, as indicated by the line $x\,x$, Fig. 2; Fig. 2, a horizontal section of the same, taken in the line $y\,y$, Fig. 1; Fig. 3, a vertical section of the same, taken in the line $z\,z$, Fig. 1; Fig. 4, a horizontal section of the same, taken in the line $x'\,x'$, Fig. 1; Fig. 5, a detached side view of the auger pertaining to the same.

Similar letters of reference indicate corresponding parts.

This invention relates to a new and useful implement or tool for cutting out and removing the incrustation in the tubes of tubular boilers; and it consists in the employment or use of an auger arranged with a screw and nut, and also with a guide-plate, as hereinafter fully shown and described, whereby the desired work may be performed expeditiously and in a successful manner.

A represents a screw, at one end of which there is a fixed circular plate, $a$, corresponding in diameter to the internal diameter of the tubes to be cleaned, and below this plate $a$ there is a shank or tang, $b$, to which bits $c\,c$ are secured at opposite sides and one at each edge. These bits constitute an auger or boring-tool, and said bits are secured to the tang $b$ by screws $d$; and, if necessary or desired, the screws $d$ may pass through oblong holes in the bits to admit of a lateral adjustment of the latter in order to compensate for wear and to adapt the diameter of the auger to the internal diameter of the tube in which it is to work. (See Figs. 4 and 5.)

B is a nut, through which the screw A passes. This nut is of cylindrical form, and is equal in diameter to the internal diameter of the tube to be cleaned. The upper end of this nut is provided with flanges $e$, which fit or work in guides $j$ at the under side of a plate, C. (See Fig. 3.) The plate C is slotted longitudinally, as shown at $k$, to allow the screw A to pass through, and the plate C at one end has a cylindrical plug, D, attached. (Shown in Fig. 1.)

The implement or tool is used as follows: The plug D is fitted into the end of one of the tubes of a boiler and the nut B fitted in the end of an adjoining tube, the nut and screw being capable of lateral adjustment so as to conform to the space or distance between the tubes; and the nut B is allowed to work or have a slight degree of play in its attachment to plate C, (the upper end of the nut and its flanges $e$ being rounded,) so as to prevent any undue strain, either of the plate, nut, or screw, under the resistance which may be offered to the auger in the prosecution of the work. By turning the screw A, which may be done through the medium of a hand-wheel or handle, E, the auger will effectually clean or cut out the incrustation from the tube in which it is fitted the operator pressing his knee on plate C to resist the upward pressure of the screw and insure the auger being properly fed to its work.

Two tubes of a boiler are shown in red in Fig. 1.

The circular plate $a$ on the screw serves as a guide for the auger and screw.

Having thus described my invention, I claim as new and desire to secure by Letters Patent—

1. The combination of the cutting-tool $c\,c$, screw A, nut B, guide-plate C, and plug D, all arranged to operate substantially as and for the purpose herein set forth.

2. The slotting of the plate C and the connecting of the nut B thereto, so that it may slide or be adjusted laterally, and having the plate C provided with a plug, D, substantially as and for the purpose specified.

JOHN WERNER, JR.

Witnesses:
  D. R. BAXTER,
  DANIEL BAXTER.